United States Patent [19]

Pieper et al.

[11] Patent Number: 4,517,152
[45] Date of Patent: May 14, 1985

[54] METHOD OF TESTING FUEL ELEMENT TUBES FOR DEFECTS

[75] Inventors: Kurt Pieper, Troisdorf; Rainer Scharpenberg, Waldmichelbach, both of Fed. Rep. of Germany

[73] Assignees: Krautkramer GmbH, Cologne; Brown Boveri Reaktor GmbH, Mannheim, both of Fed. Rep. of Germany

[21] Appl. No.: 439,039

[22] Filed: Nov. 4, 1982

[30] Foreign Application Priority Data

Dec. 12, 1981 [DE] Fed. Rep. of Germany ....... 3149362

[51] Int. Cl.³ ............................................. G21C 17/06
[52] U.S. Cl. .................................... 376/252; 376/259; 73/611
[58] Field of Search ............... 376/252, 259; 73/622, 73/625, 628, 641, 609, 611

[56] References Cited

U.S. PATENT DOCUMENTS

| | | | |
|---|---|---|---|
| 4,313,791 | 2/1982 | Lawrie et al. | 376/252 |
| 4,366,711 | 1/1983 | Weilbacher et al. | 376/252 |
| 4,428,236 | 1/1984 | Votava et al. | 376/252 |

FOREIGN PATENT DOCUMENTS

| | | | |
|---|---|---|---|
| 0063681 | 2/1982 | European Pat. Off. | |
| 2422439 | 11/1975 | Fed. Rep. of Germany. | |
| 360126 | 12/1976 | Fed. Rep. of Germany. | |
| 2528422 | 12/1976 | Fed. Rep. of Germany | 376/252 |
| 2659555 | 7/1978 | Fed. Rep. of Germany | 376/252 |

OTHER PUBLICATIONS

"Ortung Defekter Brennstabe in Bestrahlten Brennelementen", Tagungsbericht der Jahrestagung Kerntechnick 80, Reactortagung 1980, Berlin, 25–27, Mar. 1980, published by Deutsches Atomforum e.V. Bonn, p. 827 et seq., G. Baro.

Primary Examiner—Sal Cangialosi
Attorney, Agent, or Firm—Ervin B. Steinberg; Philip J. Feig

[57] ABSTRACT

The invention relates to a method for testing fuel element tubes by ultrasonic energy. For testing, each tube becomes disposed in the space between a transmit transducer and a receive transducer. The echo signals falling within a predetermined time interval are evaluated. Since the distance between the transducers may vary as the transducers move through the space between fuel element tubes, the transmitted signal reaching the receive transducer without passing through the tube may be confused with the revolving echo signal. Therefore, this invention discloses an arrangement for cyclically controlling the setting of the time gate before each such tube is in position between the transducers. To this end, the ultrasonic transit time of signals between the transmit transducer and the receive transducer is measured in the gap between the last tested tube and the next to be tested tube. A constant value is subtracted from the measured transit time value and this constant value is selected so that the transmitted signal received during the transit time measurement falls just outside the gated time interval.

1 Claim, 6 Drawing Figures

METHOD OF TESTING FUEL ELEMENT TUBES FOR DEFECTS

BRIEF SUMMARY OF THE INVENTION

This invention relates to an ultrasonic method for testing fuel element tubes for defects, such tubes being assembled in bundles to form a complete reactor core, using ultrasonic transducers. One transducer, forming the transmit transducer, transmits ultrasonic search pulses into the tube or sheath of the fuel element while an opposite transducer, the receive transducer, receives ultrasonic signals from the tube. The received signals, if falling within a predetermined time range, i.e. a time gate, are evaluated by an evaluation means which includes an amplitude discriminator.

A method of this type is known, having been described for example in an article by G. Bäro et al entitled "Ortung defekter Brennstäbe in bestrahlten Brennelementen", Tagungsbericht der Jahrestagung Kerntechnik 80, Reaktortagung 1980, Berlin, 25–27 March 1980; published by Deutsches Atomforum e.V. Bonn, pp. 827 et seq. The purpose of the time gate, although the latter is not described in detail in that article, is to separate the ultrasonic signals which reach the receive transducer from the tube, known as the revolving or circumferential echo, from the signal transmitted by the transmit transducer and passing directly to the receive transducer, the transmitted signal. Only by this feature is it possible to determine automatically the transit time of the revolving echo signal without obtaining a misreading due to the interference of the transmitted signal.

In the methods known heretofore a constant time gate setting has been used. This arrangement, however, has been proven disadvantageous since the distance between the two transducers varies greatly as the transducers pass through the array of tubes. Therefore, it is possible that transmitted signals may also arrive within the gated time interval and, hence, defective fuel tubes may become classified as being defect-free.

From German OS No. 24 22 439 it is known to adjust the time gate when the thickness of the workpiece changes. In that described arrangement a change of the workpiece thickness is indicated by a reference signal responsive to the occurrence of the workpiece rear wall echo signal. Utilizing that method, that is, periodically monitoring the thickness of the workpiece and adjusting the time gate accordingly, is possible only with the greatest circuit complexity when testing fuel tubes. Moreover, in such an arrangement changes arising from the spacing between the transducers, i.e. those not caused by a change in thickness of the tubes, are not taken into consideration.

The present invention discloses a simplified method for changing the setting of the time gate in response to the spacing between the transmit transducer and receive transducer as both transducers pass through the spaces between the tubes.

To this end, the time gate setting is redetermined for each tube to be tested prior to such tube becoming disposed between the transmit transducer and the receive transducer. Accordingly, in the space between the last tested tube and the next to be measured tube the transit time of the echo signal between the transmit transducer and receive transducer is measured. Thereafter, a constant value is subtracted from the transit time, such constant value being selected so that the transmitted signal indication obtained during the transit time measurement no longer falls within the gated time interval.

Other particulars and advantages of the present invention will be apparent from the following description when taken in conjunction with the accompanying drawings.

BRIEF DESCRIPTION OF THE DRAWINGS

FIG. 2b shows the echo corresponding electrical signals corresponding to FIG. 2a;

DETAILED DESCRIPTION OF THE INVENTION

Numeral 1 refers to a fuel element bundle which comprises fuel elements 2 and guide tubes 3. Each fuel element 2 basically comprises a tubular jacket, the fuel tube, which is filled with radioactive material. Water fills the space between the fuel elements 2 and the guide tubes 3.

Figure 3A:
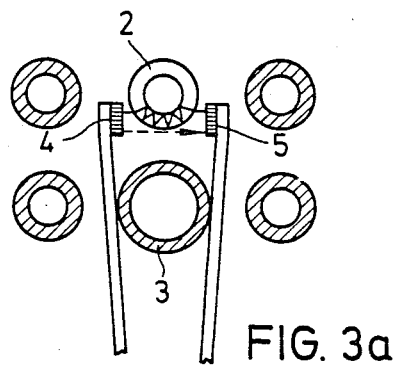
FIG. 3a is a plan view depicting the transmit transducer and the receive transducer in position for testing a fuel tube.

For testing the fuel element tubes, ultrasonic transducers 4 and 5 disposed on respective finger shaped supports 6 and 7 are moved between the fuel elements 2 to cause the transmit transducer 4 to transmit ultrasonic waves into the tube to produce a revolving (circumferential) echo signal (position I), see zig-zag signal path in FIG. 3a. This echo signal is received by the receive transducer 5 and the resulting electrical signal is evaluated by the test instrument 8 and displayed on the screen of a cathode ray tube 9. Conductors 10 and 11 connect the transmit transducer and the receive transducer to the instrument 8.

Numerals I to IV depict the different positions of the transducers as well as the corresponding echo indications on the cathode ray tube screen 9. In position I there can be seen the transmit pulse SI, the revolving echo signal UE, as well as the transmitted signal DE arising from the ultrasonic transmit pulse passing from the transmit transducer 4 directly to the receive transducer 5, see dashed signal path in FIG. 3a. When performing dynamic testing during which the transmit transducer 4 and receive transducer 5 are moved continuously past the fuel elements 2, the transmitted signal DE is disturbing as it appears in close proximity to the revolving echo signal UE. Particularly, when a defective tube is tested and the amplitude of the revolving echo diminishes due to ultrasonic energy scatter into the interior of the fuel element, it is readily possible to have an erroneous indication on account of the presence of the transmitted signal. For this reason a time gate circuit is used within which, as far as possible, only revolving echo signals are received. This gated interval 12 is shown by dashed lines. As stated heretofore, the use of a gate circuit with constant time axis setting leads to erroneous readings. Because of the change of the spacing between the transducers along their path between the fuel elements, see dashed path of the finger like supports 6 and 7, it is possible that the transmitted signals may also fall within the time gate (position III) or, alternatively, the gate is not properly adjusted and the revolving echo signal falls outside the time gate.

In accordance with the invention the start of the time gate is shifted in correspondence with the motion of the transducers 4 and 5 along their path through the spacing of the fuel elements. To this end, as seen from FIG. 2a, the position of the transmitted signal and, hence, the transit time $T_L$ of the ultrasonic pulses between the transmit transducer 4 and the receive transducer 5, is determined in the gap between always the last tested tube and the next to be tested tube. The start of the gate interval is then given by subtracting a constant value C from the measured transit time value $T_L$. The constant value C is somewhat greater than the constant width B of the gate 12 and is selected so that the transmitted signal DE received when measuring the transit time falls just outside the gate. With the gate parameters determined as described, see FIG. 3a, the next fuel element 2 is tested. Thereafter, the same procedure is repeated for determining the setting of the time gate.

Figure 1:
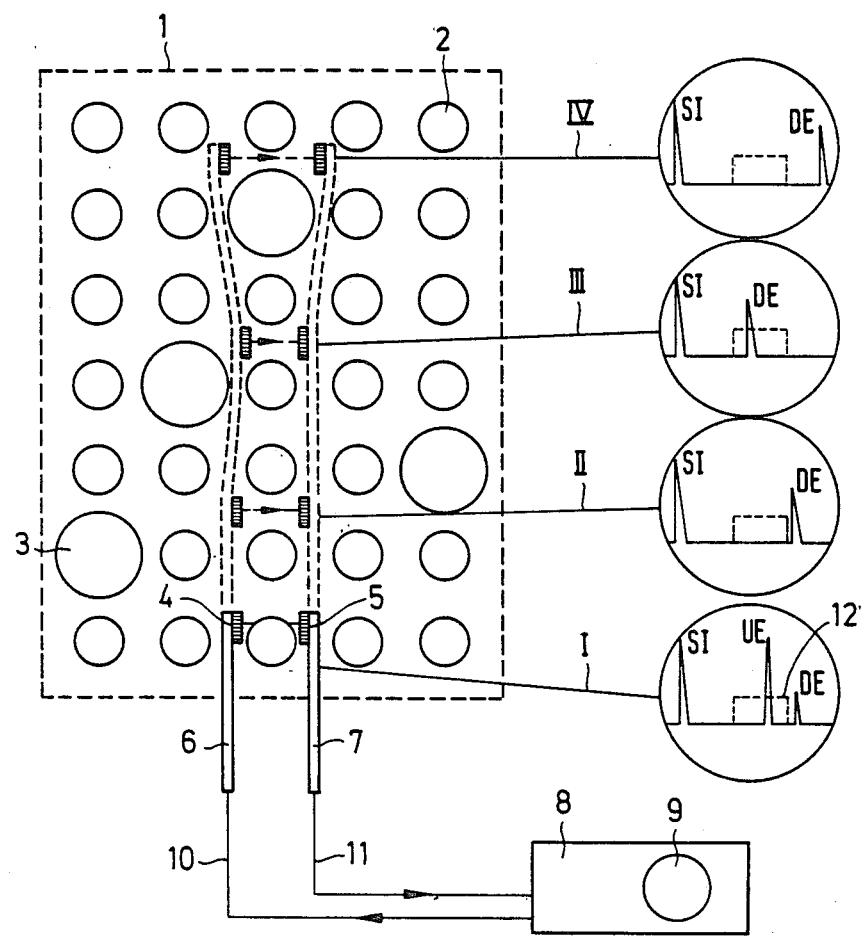
FIG. 1 is a plan view showing a portion of a fuel tube bundle and an ultrasonic transmit transducer and an ultrasonic receive transducer disposed at four different positions.
Figure 2A:
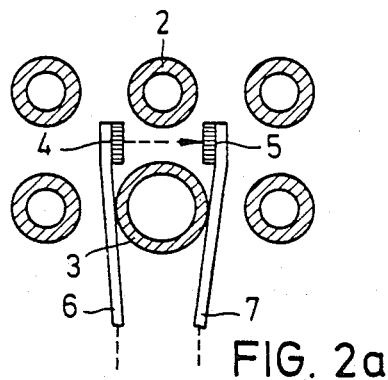
FIG. 2a is a plan view depicting the transmit transducer and the receive transducer in position for determining the time gate setting.
Figure 2B:
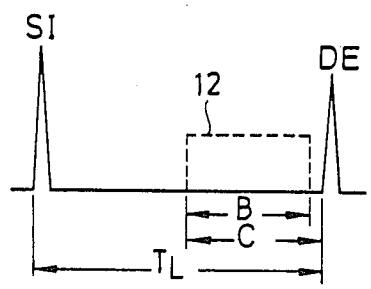
Figure 3B:
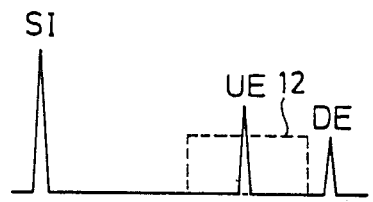
FIG. 3b shows the echo corresponding electrical signals corresponding to FIG. 3a, and FIG. 4 shows a schematic electrical circuit arrangement for practicing the method forming this invention.

FIGS. 2b and 3b show the echo signal displays corresponding to the position of the transducers in FIGS. 2a and 3b. The gate 12 is shown by dashed lines.

Figure 4:
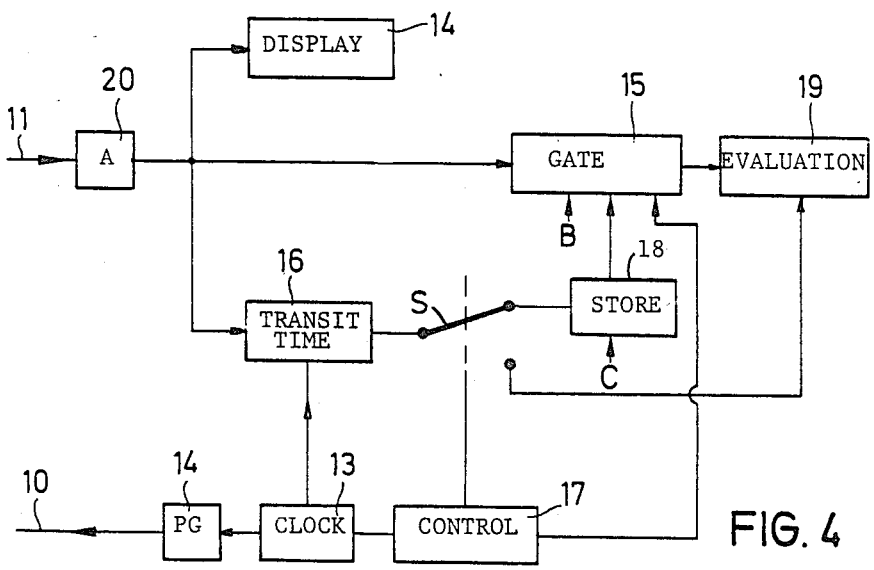

FIG. 4 shows a circuit arrangement for practicing the method described heretofore. A clock 13 periodically provides trigger signals to a pulse generator 14 for providing electrical transmit pulses to the transmit transducer 4. The electrical signals corresponding to received ultrasonic echo signals provided by the receive transducer 5 are fed to the amplifier 20, a display means 14, a gate circuit 15 and a transit time measurement means 16. When the transducers 4 and 5 are in the position indicated in FIG. 2a, i.e. between the fuel elements, a control means 17 provides a connection by switch S between the transit time measurement means 16 and a storage means 18 for storing the start or opening of the gate, i.e. the measured transit time value $T_L$ minus an adjustable constant value C. The constant value C can be set into the storage means, for example, by means of an encoding switch, not shown. The gate circuit 15 remains inhibited during the step of determining the gate setting.

When the transducers have advanced into the position illustrated by FIG. 3a for testing the fuel element 2, the control means 17 connects the transit time measurement means 16 via switch S to the evaluation unit 19. Also the gate circuit 15 is operative to cause signals occurring within the gated time interval 12 to pass to the evaluating unit 19. The constant gate width B is adjusted by means of an encoding switch, not shown. The gate circuit 15 is normally an AND gate as known to those skilled in the art.

The method described hereinbefore is not limited to the testing of fuel element tubes and other tubular arrays in a nuclear reactor, but is useful also for testing other closely spaced tubular articles, such as the tubes of a heat exchanger.

What is claimed is:

1. The method of testing spaced fuel element tubes which are assembled in bundles to form a reactor core by ultrasonic energy, wherein an ultrasonic transmit transducer and an ultrasonic receive transducer are moved through open spaces between the tubes and when testing a tube are disposed with a tube in the space between said transducers, said transmit transducer when in position for testing a tube being energized to cause ultrasonic energy to propagate in said tubing and the resulting revolving echo signal being received by said receive transducer and if occurring within a predetermined gated time interval (12) being passed to an evaluation means, the improvement comprising:
    determining anew for each tube to be tested the start of said gated time interval (12) by measuring the transit time value ($T_L$) of ultrasonic signals traversing the distance from said transmit transducer (4) to said receive transducer (5) when said transducers are in the open space between the last tested tube and the next to be tested tube, and
    subtracting a constant value (C) from the transit time value ($T_L$), said constant value (C) being selected to cause the transmitted ultrasonic signal (DE) received during the transit time measurement to fall just outside said gated time interval (12).

* * * * *